Dec. 8, 1964 L. D. HAGENBOOK 3,160,265
ROLLER SUPPORT FOR SHAKER CONVEYOR TROUGH
Filed April 12, 1962 2 Sheets-Sheet 1

INVENTOR.
Loy D. Hagenbook
BY
ATTORNEYS

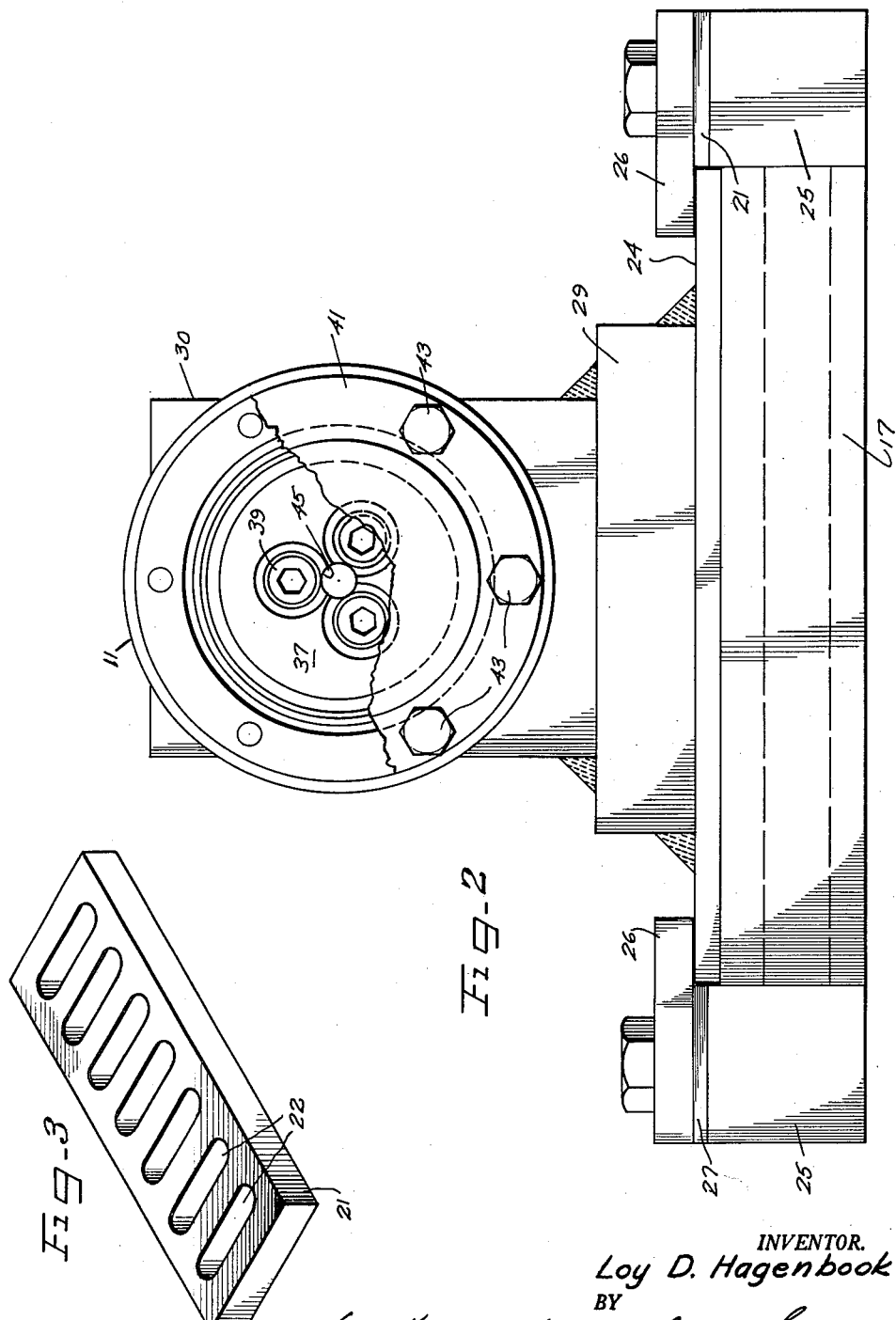

United States Patent Office 3,160,265
Patented Dec. 8, 1964

3,160,265
ROLLER SUPPORT FOR SHAKER CONVEYOR TROUGH
Loy D. Hagenbock, Chicago, Ill., assignor to Goodman Manufacturing Company, Chicago, Ill., a corporation of Illinois
Filed Apr. 12, 1962, Ser. No. 187,027
6 Claims. (Cl. 198—220)

This invention relates to improvements in shaker conveyors and more particularly relates to an improved form of trough support for shaker conveyor trough lines.

A principal object of the invention is to provide an improved form of roller trough support for shaker conveyor trough lines of the type used in foundries and the like, arranged with the view toward cushioning the loads on the trough line.

Another object of the invention is to provide a cushioned roller support for the troughs of shaker conveyor trough lines of the type used for conveying heavy materials, providing cushioning means for the troughs cushioning the loads caused by the dropping of heavy castings on the troughs.

Another object of the invention is to improve upon the roller trough supports for shaker conveyor trough lines by supporting the trough supporting rollers in direct vertical alignment with cushioning pads supporting the shaft supporting brackets for the rollers.

A still further object of the invention is to provide an improved form of roller support for shaker conveyor trough lines supporting the trough rollers on cantilever shafts and accommodating the lubricating of the support bearings for the rollers through the shafts, and thereby reducing the number of seals heretofore required to retain lubricant to the bearings and to keep dust from the bearings.

These and other objects of the invention will appear from time to time as the following description proceeds and with reference to the accompanying drawings wherein:

FIGURE 2 is an end view of one of the roller supports looking substantially along line II—II of FIGURE 1, showing the end cap for the roller broken away and the trough removed from the roller; and FIGURE 3 is a perspective view of a form of cushioning pad which may be utilized to cushion the shock loads on the shaker conveyor trough and support roller therefor.

Figure 1:
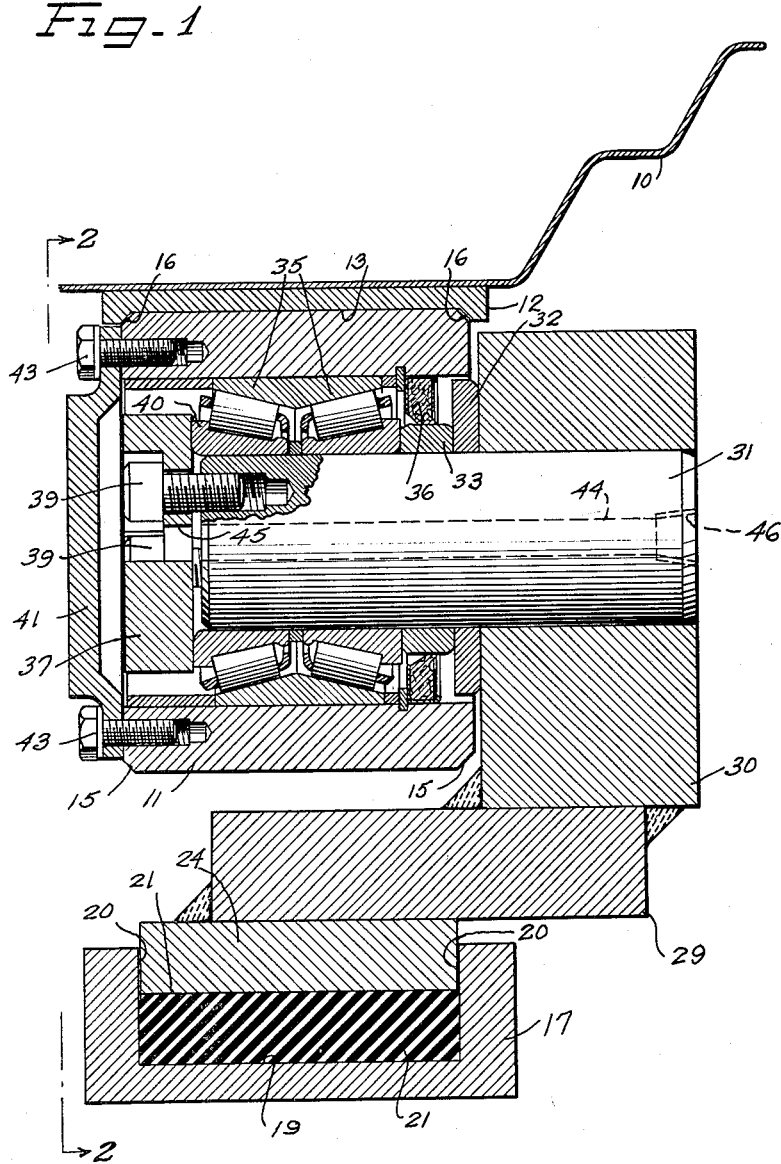
FIGURE 1 is a fragmentary transverse sectional view taken through one half of a shaker conveyor trough and through one of the roller supports therefor.

In the embodiment of the invention illustrated in the drawings, I have shown in FIGURE 1 a partial fragmentary transverse vertical sectional view taken through a shaker conveyor trough 10 and the support for one half of the trough. The shaker conveyor trough 10 may be one trough of a shaker conveyor trough line in which the troughs are connected together in aligned relation with respect to each other and are of a type used in foundries to convey heavy castings from one place to another. The troughs 10 are bolted together in a conventional manner and each trough is usually supported on a plurality of pairs of longitudinally spaced rollers, only one of said rollers supporting one half of the trough, being shown herein and designated by reference character 11.

As shown in FIGURE 1 the trough 10 has a shoe 12 mounted on the bottom thereof, to one side of the longitudinal center line of the trough and having a downwardly opening guide channel 13 formed therein, generally conforming to and riding along the periphery of the roller 11. Another shoe 12 (not shown) is mounted on the bottom of the trough on the opposite side of the longitudinal center line of the trough from the shoe 12 shown, and in alignment therewith, to be supported on a laterally spaced roller 11 (not shown) in axial alignment with the roller 11 shown, it being understood that the shoes 12 are mounted along the bottom of the trough 10 wherever it is desirable and feasible to support the troughs on rollers.

As shown in FIGURE 1 the roller 11 is generally cylindrical in form and has opposite beveled peripheral edges 15 engaged by and guiding corresponding beveled side walls 16 of the downwardly open channelled portions 13 of the shoe 12.

The support for each roller 11 includes a channelled base 17 having an upwardly opening channel 19 extending longitudinally of the trough line. The channel 19 has parallel spaced longitudinally extending inner side walls 20 and forms a receptacle for a resilient cushioning pad 21. The resilient cushioning pad 21 has spaced cutaway portions 22 extending transversely thereof and accommodating the flow of the material of the cushion, as said cushion is subjected to heavy shock loads. The cushioning pad 21 may be made from rubber, an elastomer or from any of the well known substitutes for rubber, and forms a cushioning support for a block 24 extending for substantially the length of the cushioning pad 21 and guided along the inner side walls 20. Said cushioning pad is initially prestressed to stabilize the support for the roller 11. Opposite ends of the upwardly opening channel 19 are closed by abutment bars 25 which may be welded thereto and which may be bolted or otherwise secured to the floor. Retainer gibs 26 are spaced above the upper surfaces of the abutment bars 25 by shims 27 and extend over the ends of the support block 24, to retain said block to the upwardly opening channel 19, and to accommodate said block to move downwardly within said channel as the trough 10 is subjected to shock loads. The thickness of the shims 27 is governed by the thickness of the block 24 to space the retainer gibs 26 to extend over the upper surface of the support block 24 and prestress the cushioning pad 21 to the desired extent.

The support block 24 has an outboard support member 29 welded or otherwise secured to its top surface and extending laterally therefrom beyond the base 17. The outboard support member 29 has a shaft bracket 30 welded or otherwise secured thereto and extending vertically therefrom and forming a support for a transverse shaft 31, forming a bearing support for the roller 11. The outboard support member 29 and the shaft bracket 30 form an overhanging or outboard bracket supporting the shaft 31 to extend laterally inwardly therefrom over the cushioning pad 21 to form a cantilever support for the roller 11, supporting said roller with its transverse center directly above the center of the cushioning pad 21.

The shaft 31 has a washer 32 thereon and abutting the inner face of the shaft bracket 30 and abutted at its outer face by a collar 33. The washer 32 and collar 33 form inner retainers for a pair of oppositely facing roller bearings 35, supporting the roller 11 for free rotation about the shaft 31. A seal 36 extends within the roller 11 and has wiping engagement with the outer surface of a collar 33, to retain lubricant to the bearings 35 and to prevent the entrance of dust into said bearings.

A bearing retainer cap 37 is secured to the end of the shaft 31 as by machine screws 39, and is pressed by said machine screws into abutting engagement with an inner race 40 of the roller bearings 35, to retain said roller bearings to the shaft 31 and to press said race into engagement with the collar 33. An end cap 41 is secured to the outer end of the roller 11 as by machine screws 43 and prevents the entrance of dust to the bearings 35 and the loss of lubricant from said bearings.

The shaft 31 is through drilled from its outer end, as indicated by reference character 44. The through drilled portion 44 of the shaft 31 has communication with a drilled hole 45 extending through the thrust cap or plate 37 and affords communication from the outer end of the shaft 31 to the bearings 35, to accommodate a lubricant to be forced to said bearings by a pressure lubricating gun or the like. A lubricant fitting (not shown) may be threaded within an outwardly tapered threaded outer end portion 46 of the shaft 31.

In use, the rollers 11 form a permanent support for the trough 10, and said rollers and the supports therefor are retained in position on the floor by the retainer gibs 26, it being understood that the rollers 11 are arranged in pairs of laterally spaced aligned rollers, spaced longitudinally along the trough line.

It may be seen from the foregoing that a simple and improved form of roller support for the troughs of a shaker conveyor trough line has been provided in which the rollers are supported on cantilever shafts and the loads on the rollers are concentrated in the centers of the cushioning pads 21.

It may further be seen that with the roller support just described, it is only necessary to seal one side of the bearings for each roller, and that the bearings for the roller may readily be lubricated by the use of a lubricant fitting threaded in the outer end of the stub shaft forming the cantilever support for the associated roller, the end cap 41 directing the lubricant to flow to the bearings under pressure.

While I have herein shown and described one form in which my invention may be embodied, it may readily be understood that various variations and modifications in the invention may be attained without departing from the spirit and scope of the novel concepts thereof, as defined by the claims appended hereto.

I claim as my invention:

1. In a trough support for shaker conveyor trough lines and in combination with a shaker conveyor trough,
    a base having an upwardly opening channel formed therein,
    a resilient cushioning pad mounted in said channel,
    an outboard support guided in said channel and mounted on said cushioning pad,
    and including a cantilever shaft extending over the said cushioning pad and a support roller for said trough journaled on said shaft in centered relation with respect to said cushioning pad.

2. In a roller support for shaker conveyor trough lines and in combination with a shaker conveyor trough,
    a base having an upwardly opening channel extending therealong,
    a resilient cushioning pad mounted in said channel,
    a support block mounted on said resilient cushioning pad and vertically guided in said channel,
    a trough supporting roller spaced above said cushioning pad in centered relation with respect thereto,
    the support for said roller comprising a cantilever shaft and an outboard support for said shaft mounted on said support block.

3. In a roller support for shaker conveyor trough lines and in combination with a shaker conveyor trough,
    a pair of aligned laterally spaced trough supporting rollers rotatable about coaxial transverse axes and forming a roller support for said shaker conveyor trough,
    upwardly opening channel like bases secured to the floor and having resilient cushioning pads mounted therein, outboard bearing supports vertically guided by said bases and resting on said cushioning pads and including stub shafts overhanging said cushioning pads,
    and bearing means mounting said rollers on said shafts in aligned relation with respect to said cushioning pads.

4. A roller support particularly adapted for shaker conveyor troughs and the like,
    comprising a base having an upwardly opening channel extending therealong,
    a resilient cushioning pad mounted within said channel,
    a support block supported on said cushioning pad and vertically guided by said channel,
    an outboard support mounted on said block and extending upwardly therefrom laterally of said base,
    a bracket extending vertically of said block on the outer side of said base,
    a cantilever shaft mounted in said bracket and extending inwardly therefrom over said cushioning pad,
    and a trough supporting roller journaled on said shaft in centered relation with respect to said cushioning pad.

5. A roller support particularly adapted for shaker conveyor troughs and the like,
    comprising a base,
    a shaft bracket mounted on said base and extending vertically of said base laterally of the outer margins thereof,
    a cantilever shaft mounted on said bracket and extending from the inner end of said bracket over said base,
    a bearing on said shaft,
    a roller rotatably mounted on said bearing,
    a lubricant passageway extending through said shaft and opening to the outer end of said bracket,
    a seal for the end of said shaft adjacent said shaft bracket,
    and an end cap for said roller closing the opposite end of said shaft from said seal and directing lubricant under pressure to said bearing.

6. A roller support particularly adapted for shaker conveyor troughs, and the like,
    comprising a base having an upwardly opening channel extending therealong,
    a cushioning pad mounted in said channel,
    a support block extending within said channel and supported on said cushioning pad,
    retainers extending over said support block,
    a shaft bracket mounted on said support block and extending laterally outwardly of said base,
    a cantilever shaft mounted on said shaft bracket and extending inwardly of said shaft bracket over said base and cushioning pad,
    antifriction bearings mounted on said shaft,
    and a roller mounted on said antifriction bearings in centered relation with respect to said cushioning pad.

References Cited in the file of this patent

UNITED STATES PATENTS 1,937,593     Rich _____ Dec. 5, 1933

FOREIGN PATENTS 611,606     Germany _____ Mar. 14, 1935